United States Patent [19]

Fauteux

[11] Patent Number: 5,712,057
[45] Date of Patent: Jan. 27, 1998

[54] POLY-SULFIDE AND CARBON ELECTRODE MATERIAL AND ASSOCIATED PROCESS

[75] Inventor: Denis G. Fauteux, Acton, Mass.

[73] Assignee: Mitsubishi Chemical Corporation, Tokyo, Japan

[21] Appl. No.: 569,668

[22] Filed: Dec. 8, 1995

[51] Int. Cl.$^6$ ................................................. H01M 4/36
[52] U.S. Cl. ...................... 429/105; 429/101; 429/122; 429/212; 429/213
[58] Field of Search ........................... 429/101, 102, 429/104, 105, 122, 212, 213

[56] References Cited

U.S. PATENT DOCUMENTS 5,582,623 12/1996 Chu ............................................ 429/104

*Primary Examiner*—Bruce F. Bell
*Attorney, Agent, or Firm*—Dick and Harris

[57] ABSTRACT

An electrolytic cell, such as a rechargeable lithium battery, having a poly-sulfide compound attached to the cathode provides a reversible cell capacity of at least 200 mAh/g. Fabrication of an electrolytic cell containing a poly-sulfide compound which is electronically conductive and insoluble in a liquid electrolyte.

14 Claims, 1 Drawing Sheet

5,712,057

POLY-SULFIDE AND CARBON ELECTRODE MATERIAL AND ASSOCIATED PROCESS

BACKGROUND OF THE INVENTION

1. Field of the Invention

The present invention relates in general to secondary cells and, more particularly, to an electrolytic cell and electrolytic process associated therewith, wherein the cathode active material is comprised of an electronically activated poly-sulfide resulting in an electrolytic cell having a reversible capacity greater than or equal to 200 mAh/g.

2. The Prior Art

Rechargeable or secondary cells have been known in the art for many years. Furthermore, secondary cells constructed with a cathode having an active material containing a poly-sulfide which is capable of reversibly attracting or intercalating metal ions, has likewise been known in the art.

A problem associated with rechargeable batteries is the decreased ability of the cathode, over time, to reversibly attract particular metal ions associated with the positive electrode resulting in an electrolytic cell having a low specific capacity. Sulfur, which is a known positive electrode compound, will, when assembled in a battery using lithium or sodium as the negative electrode, provide a high energy density. Elemental sulfur is, however, highly corrosive and secondary cells incorporating elemental sulfur generally work well only in high temperature batteries. Poly-sulfide compounds, on the other hand, are much less corrosive than elemental sulfur and have previously been prepared and used in ambient temperature settings in conjunction with either a liquid or polymer electrolyte. However, prior art secondary cells utilizing poly-sulfide compounds are ineffective at providing high electronic conductivity because they lack delocalized $\pi$ orbitals which are necessary. Furthermore, such poly-sulfide compounds are soluble in liquid electrolytes.

For example, Liu, Meilin, et al., *Novel Solid Redox Polymerization Electrodes: All-Solid-State, Thin-Film, Rechargeable Batteries*, J. Electrochem. Soc., Vol. 138, No. 7, July 1991, discloses a cathode active material which contains a poly-sulfide. The cathode active material disclosed in the Liu article exchanges electrons during reduction, which, in turn, frees the cathode material from the cathode itself, resulting in the reduced cathode material being highly soluble in the electrolyte. Although an amount of the material re-anchors at the cathode during oxidation, some amount of the material is irreversibly dissolved. As each successive cell cycle occurs, the amount of material which is irreversibly dissolved increases. Furthermore, such cathode active materials are unable to produce an energy density greater than 200 mAh/g and are not electronically conductive in and of themselves. Therefore, they lack the ability to effectively transfer ions reversibly back and forth between the anode and the cathode.

Because poly-sulfide polymers are poor electronic and ionic conductors, in order to utilize poly-sulfides in an electrolytic cell, it has been found to be useful to have a second compound associated with the poly-sulfide which is electronically conductive. Furthermore, the compound must be insoluble in a liquid or polymer electrolyte so that the reversible capacity of the cell remains substantially consistent during cycle life. In order to achieve a specific capacity greater than 200 mAh/g, the equivalent weight of the poly-sulfide compound should be less than 135 g/mole. Generally, as the equivalent weight of the compound increases, the capacity of the cell decreases. Therefore, prior art compounds, such as those disclosed in the Liu article, have a low energy density because of their high equivalent weights.

It is thus an object of the present invention to provide a high capacity (mAh/g) cathode material having excellent reversibility, good electronic conductivity, and low solubility in a liquid electrolyte.

These and other objects of the present invention will become apparent in light of the present specification, claims, and drawings.

SUMMARY OF THE INVENTION

The present invention is directed to a secondary cell comprising a liquid electrolyte, a first electrode and a second electrode, wherein one of the first or second electrodes is a cathode, and means for increasing the reversible capacity of the secondary cell to a reversible capacity greater than or equal to 200 mAh/g, the reversible capacity increasing means including. The reversible capacity increasing means includes a poly-sulfide operatively associated with the cathode, means for precluding the poly-sulfide from becoming soluble in the electrolyte, means for activating the poly-sulfide into an electronically conductive state, and means for breaking one or more of the poly-sulfide bonds so as to reversibly attract particular ions in the liquid electrolyte.

In a preferred embodiment of the invention, the means for activating the poly-sulfide into an electronically conductive state comprises a material associated with the poly-sulfide and the cathode which is electronically conductive and insoluble relative to the liquid electrolyte.

In one such embodiment, the material for activating the poly-sulfide into an electronically conductive state includes carbon or gold—although other convention materials are also contemplated for use as would be understood to those having ordinary skill in the art.

In another preferred embodiment of the present invention, the means for precluding solubility of the poly-sulfide comprises a material associated with the poly-sulfide and the cathode and which is electronically conductive and insoluble relative to the liquid electrolyte In addition, the means for breaking one or more of the poly-sulfide bonds may comprise particular ions, such as lithium ions, in the liquid electrolyte.

The present invention also contemplates an electrolytic process for a secondary cell having a first electrode and a second electrode, wherein one of the first and second electrodes is a cathode, and a liquid electrolyte. The electrolytic process comprises the steps of: a) associating a poly-sulfide with the cathode; b) precluding the poly-sulfide from becoming soluble in the electrolyte; c) activating the poly-sulfide into an electronically conductive state; and d) breaking one or more of the poly-sulfide bonds to in turn reversibly attract particular ions in the electrolyte.

In a preferred embodiment, the step of associating the poly-sulfide with the cathode further comprises the step of attaching the poly-sulfide to a layer of material which is operatively associated with the cathode.

In another preferred embodiment, the step of precluding the poly-sulfide from becoming insoluble in the liquid electrolyte further comprises the step of attaching the poly-sulfide to a layer of material which is operatively associated with the cathode.

In yet another preferred embodiment, the step of activating the poly-sulfide into an electronically conductive state further comprises the step of attaching the poly-sulfide to a layer of material which is operatively associated with the cathode, wherein the layer of material is electronically conductive.

The present process also contemplates that the step of breaking at least one of the poly-sulfide bonds comprises the step of allowing particular ions associated with the liquid electrolyte to come into contact with the poly-sulfide so as to reduce the poly-sulfide bond. It is also contemplated that electrolytic process operate at ambient temperature.

BEST MODE FOR PRACTICING THE INVENTION

Figure 1:
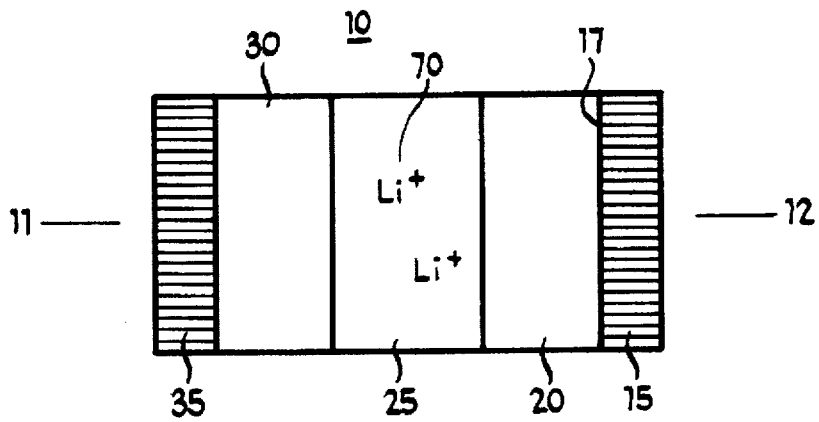
FIG. 1 of the Drawings is a schematic representation of an electrolytic cell of the present invention.

While this invention is susceptible of embodiment in many different forms, there is shown in the drawings and will herein be described in detail, one specific embodiment with the understanding that the present disclosure is to be considered as an exemplification of the principles of the invention and is not intended to limit the invention to the embodiment illustrated.

Electrolytic cell 10, which in a preferred embodiment may comprise a rechargeable lithium battery, is shown in FIG. 1 as including negative electrode side 11, electrolyte 25, and positive electrode side 12. The negative electrode side 11 (generally referred to as the anode) includes current collector 35, typically constructed of nickel, iron, stainless steel, and/or copper foil, and a body of negative electrode active material 30. In a preferred embodiment, negative electrode active material 30 is constructed of compounds or alloys of lithium.

Figure 2:
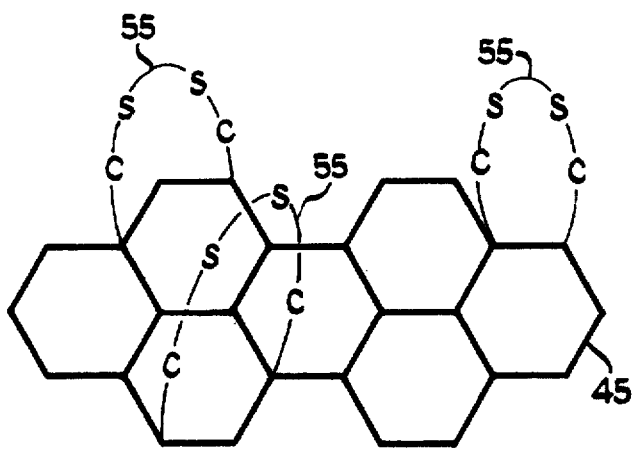
FIG. 2 of the drawings is a schematic representation of a chemical compound from the present invention.

Positive electrode side 12 (generally referred to as the cathode) includes current collector 15, typically constructed of aluminum, nickel, iron, and/or stainless steel, cathode surface 17, and a body of positive electrode active material 20. Positive electrode active material 20 is usually different than the negative electrode active material 30. Furthermore, positive electrode active material 20 comprises means for increasing the reversible capacity of the secondary cell greater than or equal to 200 mAh/g. Positive electrode active material 20 is constructed of a poly-sulfide 55 (FIG. 2) operatively associated with electronic activating means 45. In a preferred embodiment of the present invention, electronic activating means 45 includes carbon, such as exfoliated graphite sheets, although it is contemplated that other materials which will activate poly-sulfide 55 into an electronically conductive state, such as gold and other carbon containing compounds, also be used. Indeed, such an electronic activating means (i.e. exfoliated graphite) provides the requisite electronic conductivity because of delocalized $\pi$ orbitals throughout its structure. As can be seen, poly-sulfide 55 (FIG. 2) is covalently bonded to the exfoliated graphite 45 to, in turn, provide a compound that has a high electronic conductivity.

Generally, the formula of the poly-sulfide compound is in the form of:

R-S-S-R where, the R group is, in a preferred embodiment, exfoliated graphite sheets having delocalized $\pi$ orbitals, and the S group is a sulfide. The content of the poly-sulfide in the compound should be sufficient to provide a reversible capacity greater than or equal to 200 mAh/g. It will be understood by those with ordinary skill in the art that in order to achieve a reversible capacity of greater than or equal to 200 mAh/g, the equivalent weight of the compound should be less than or equal to 135 g/mole.

The means for precluding the poly-sulfide from becoming soluble in the electrolyte is also the compound which is attached to the poly-sulfide. However, in order to maintain the insolubility of the poly-sulfide compound, the means for precluding solubility (exfoliated graphite) must be attached or anchored to the cathode. Attachment is necessary to keep the poly-sulfide from becoming soluble in the electrolyte and to prevent the poly-sulfide compound from migrating across the electrolyte to the anode.

The means for breaking one or more of the poly-sulfide bonds is, in a preferred embodiment, the particular ions associated with the anode which migrate through the cell during discharge (i.e., lithium ions). As the lithium ions migrate toward the cathode, they interfere with and break poly-sulfide bonds. Once a poly-sulfide bond has been broken, lithium reversibly bonds with the generated sulfide complex. Accordingly, the lithium ions first reduce the poly-sulfide into two distinct sulfide complexes, and then covalently bond with the sulfide complex to form lithium sulfide attached to the exfoliated graphite sheet.

In operation, the electrolytic process takes place within an electrolytic cell 10 (FIG. 1) having an anode 11, a cathode 12 and a liquid electrolyte 25. First, a poly-sulfide, including one or more sulfur to sulfur bonds, is associated with the graphite 45, which is included in the active material 20 of the electrode. Such association will result in the poly-sulfide being effectively precluded from becoming soluble in electrolyte 25. Indeed, such insolubility exists due to the poly-sulfide being covalently bonded to a material, such as an exfoliated sheet of graphite, which is associated with the graphite 45, which is included in the active material 20 of the electrode. Also, because the exfoliated graphite sheet is electronically conductive, it "activates" the poly-sulfide into an electronically conductive state.

Figure 3:
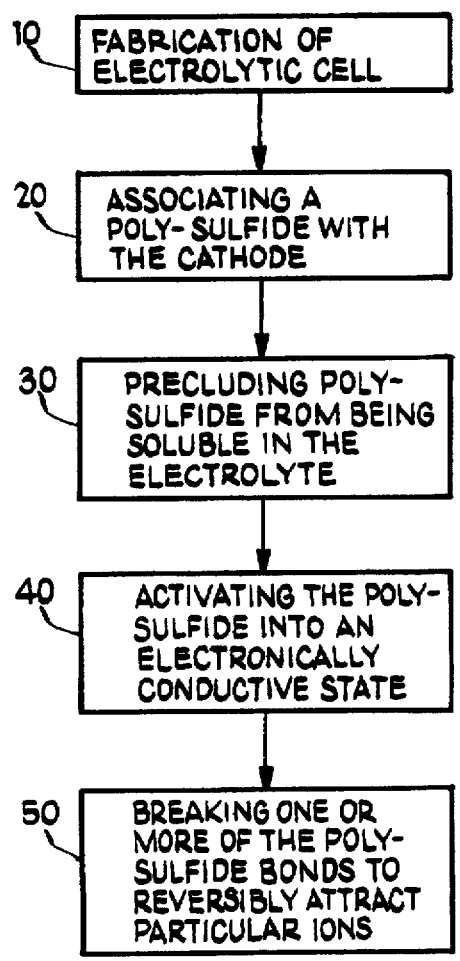
FIG. 3 is a block diagram of the present process.

Once the poly-sulfide has been 1) associated with the cathode surface 17; 2) precluded from becoming soluble in the electrolyte 25; and 3) has been activated into an electronically conductive state, electrolytic cell 10 will be ready for operation. During reduction of electrolytic cell 10 (FIG. 3), ions 70 associated with the particular metal anode 11 (generally lithium) migrate toward cathode 12. As the lithium ions get closer to the cathode, they begin to assert an attraction to the individual sulfur atoms in the sulfide complex. Once the lithium ions reach the cathode and are in close proximity with the poly-sulfide compound, the attraction the lithium ions assert is strong enough to break the poly-sulfide bond into two distinct sulfide complexes; wherein, each of the sulfide complexes are still attached to the exfoliated graphite sheet. Once the poly-sulfide bond is broken, a lithium ion covalently bonds with a sulfide complex. During the period that the poly-sulfide is reduced to an individual sulfide complex, the complex is unable to dissolve in the liquid electrolyte because of the exfoliated graphite sheet acting as an anchor associated with the active material of the electrode. Once the lithium ion has covalently bonded with the sulfide, the lithium is stored at the cathode until oxidation is initiated.

During the oxidation of the cell, a current having a voltage is passed across the cell. This current interferes with the covalent bond existing between the sulfide and the lithium to produce lithium ions and distinct sulfide complexes attached to the anchored exfoliated graphite sheet. As the current causes the lithium ions to migrate back towards anode 11, the sulfide complexes covalently bond with one another to reform the original poly-sulfide compound associated with the active material of the electrode 17. Thus, through a series of oxidation and reduction cycles, the poly-sulfide/graphite compound is able to reversibly attract the lithium ions.

Electrolyte 25 is a liquid electrolyte such as 1M $LiClO_4$ in propylene carbonate. Although electrolyte 25 is described as a liquid electrolyte, it will be understood that a polymer electrolyte, such as polyethylene oxide $LiClO_4$ or acrylate-gel-$LiClO_4$, or PAN-gel-$LiPF_6$, among others, are also contemplated for use.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

I claim:

1. A secondary cell comprising:

a liquid electrolyte;

a first electrode and a second electrode, wherein one of the first or second electrodes is a cathode;

means for increasing the reversible capacity of the secondary cell to a reversible capacity greater than or equal to 200 mAh/g, the reversible capacity increasing means including;

an electronically conductive layer and a poly-sulfide operatively associated with the cathode, means for precluding the poly-sulfide from becoming soluble in the electrolyte, wherein the solubility preclusion means comprises the poly-sulfide being non-releasably anchored to the electronically conductive layer, means for activating the poly-sulfide into an electronically conductive state, and means for breaking one or more of the poly-sulfide bonds.

2. The electrolytic cell according to claim 1 wherein the means for activating the poly-sulfide into an electronically conductive state comprises the electronically conductive layer, wherein the layer is also insoluble relative to the liquid electrolyte.

3. The electrolytic cell according to claim 2, wherein the electronically conductive layer includes carbon.

4. The electrolytic cell according to claim 2, wherein the electronically conductive layer includes gold.

5. The electrolytic cell according to claim 1 wherein the means for breaking one or more of the poly-sulfide bonds comprises lithium ions in the liquid electrolyte.

6. The secondary cell according to claim 1, wherein the reversible capacity increasing means has an equivalent weight less than or equal to 135 g.

7. A secondary cell comprising;

a liquid electrolyte;

a first electrode and a second electrode, wherein one of the first or second electrodes is a cathode; and means for increasing the reversible capacity of the secondary cell to a reversible capacity greater than or equal to 200 mAh/g, the reversible capacity increasing means including;

an electronically conductive layer and a poly-sulfide operatively associated with the cathode, means for precluding the poly-sulfide from becoming soluble in the electrolyte, wherein the solubility preclusion means comprises the poly-sulfide being non-releasably anchored to the electronically conductive layer, means for activating the poly-sulfide into an electronically conductive state.

8. The electrolytic cell according to claim 7 wherein the means for increasing the reversible capacity further includes means for breaking one or more of the poly-sulfide bonds to reversibly attract lithium ions in the liquid electrolyte.

9. The electrolytic cell according to claim 7 wherein the means for activating the poly-sulfide into an electronically conductive state comprises the electronically conductive layer, wherein the layer is also insoluble relative to the liquid electrolyte.

10. The secondary cell according to claim 7, wherein the reversible capacity increasing means has an equivalent weight less than or equal to 135 g.

11. An electrolytic process for a secondary cell having a first electrode and a second electrode, wherein one of the first and second electrodes is a cathode, and a liquid electrolyte, the electrolytic process comprising the steps of:

attaching an electronically conductive layer to a current collector for the cathode;

associating a poly-sulfide with the cathode;

precluding the poly-sulfide from becoming soluble in the electrolyte by non-releasably anchoring the poly-sulfide to the electronically conductive layer;

activating the poly-sulfide into an electronically conductive state; and breaking one or more of the poly-sulfide bonds.

12. The electrolytic process according to claim 11 wherein the step of activating the poly-sulfide into an electronically conductive state includes the step of non-releasably anchoring the poly-sulfide to the electronically conductive layer.

13. The electrolytic process according to claim 11 wherein the step of breaking at least one of the poly-sulfide bonds comprises the step of allowing lithium ions associated with the liquid electrolyte to come into contact with the poly-sulfide to reduce the poly-sulfide bond.

14. The electrolytic process according to claim 11 wherein the electrolytic process operates at ambient temperature.

* * * * *